March 21, 1933.  R. L. SPERBER  1,902,672
COLOR METER
Filed April 8, 1931
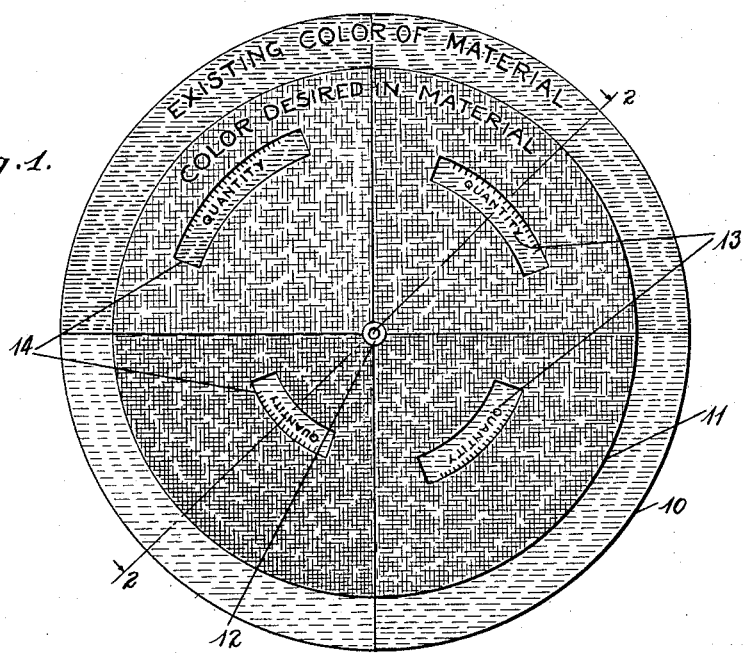
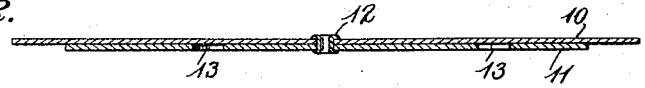
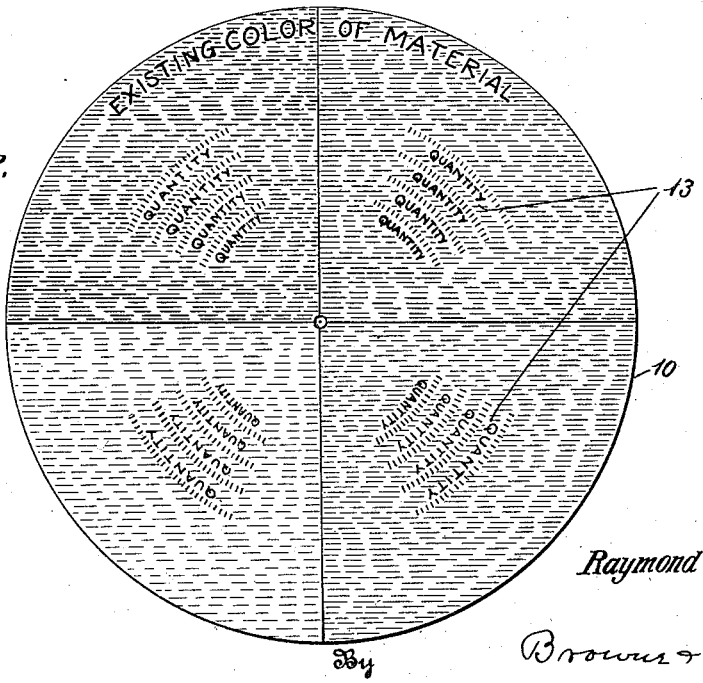
Inventor
Raymond L. Sperber
By Brown & Phipps
Attorneys Patented Mar. 21, 1933

1,902,672

UNITED STATES PATENT OFFICE

RAYMOND L. SPERBER, OF CHEVIOT, OHIO, ASSIGNOR TO WELLS & RICHARDSON COMPANY, INC., OF BURLINGTON, VERMONT, A CORPORATION OF VERMONT

COLOR METER

Application filed April 8, 1931. Serial No. 528,683.

The invention relates to coloring meters and has as an object a device to supply directions for adjusting the color of, or dyeing, material.

It is an object of the invention to provide a plurality of color displays which may be matched with existing color in material to be color adjusted and a second set of color displays one of which may be chosen as the color to which it is desired to bring the material, together with the appropriate directions for securing the desired result.

The device is capable of use with a wide range of materials. One such use is the coloring of butter. When so applied there is provided a member bearing a plurality of areas which are colored to represent shades usually found in cream. A separate set of areas is provided colored to represent the various shades to which it may be desired to bring the butter. By juxtaposing the chosen butter color area with the area showing the color which matches the cream, there is indicated by the device the appropriate set of directions for coloring the cream to the color of the butter area chosen.

An illustrative embodiment of the invention is shown in the accompanying drawing wherein:—

Fig. 1 is a face view;

Fig. 2 is a transverse section on line 2—2 of Fig. 1; and

Fig. 3 is a face view of the larger disc with the smaller disc removed.

As shown the device comprises a pair of discs 10 and 11 of different diameters pivoted together as at 12 at their centers. In the device as shown four colors are shown to be matched with the existing color of the material, which for purposes of illustration are placed upon the larger disc; and also four colors are indicated to one of which the existing color of the material may be adjusted, which are as shown placed upon the smaller disc. The colored areas are shown as bounded by radii of the discs and the colors upon the larger disc are displayed outside of the edge of the smaller disc.

Associated with each of the areas upon the larger disc, there is shown a plurality of sets of directions 13 indicated by the word "quantity", the sets of directions being as shown radially aligned, being placed at different distances from the center.

The smaller disc is shown as formed with an opening 14 radially aligned with each of the color areas thereon, the openings being at different distances from the center of the disc, by virtue of which fact the opening associated with any one of the areas upon the smaller disc, as for instance the opening farthest removed from the center of the disc will uncover the directions farthest removed from the center of the larger disc as the discs are relatively rotated. The directions upon the larger disc are so chosen that when the said outer opening is revolved into registration with one of the sets of directions, the directions will give the appropriate treatment of material of the color shown upon the outer disc at that area to bring butter made from the cream to the color upon the smaller disc shown in radial alignment with said chosen opening.

The same relation will follow with each of the other areas and openings when associated with any set of directions.

While superposed discs are shown as an illustrative embodiment of the invention, it would be obvious that the members carrying the sets of areas may be relatively movable in a wide range of embodiments, that shown being for purposes of illustration only. Therefore the invention is to be understood to be limited only within the scope of the appended claims.

I claim:

1. A coloring meter comprising, in combination, a plurality of relatively movable members, one of said members bearing a plurality of areas of varying colors to be matched against the existing color of a material to be color adjusted, another of said members bearing a plurality of areas variously colored to show colors which may be produced in material, a plurality of sets of coloring directions associated with each of said areas on one member and an indicator associated with each of the areas on the other of said members to indicate the appropriate set of directions for bringing an existing color in the material to the chosen color desired when any two areas are brought into juxtaposition.

2. A coloring meter comprising, in combination, a pair of relatively movable members, one thereof bearing a plurality of variously colored areas to be matched against the existing color of material to be color adjusted, the other thereof bearing a plurality of variously colored areas to the color of which the material may be adjusted, a plurality of sets of color adjusting directions associated with each of the areas of one of said members, one set thereof appropriate to each of the areas of the other member and an indicator associated with each of the areas of the other member to indicate the appropriate directions for bringing material of the color of one area to the desired color borne by a juxtaposed area.

3. A coloring meter comprising, in combination, a pair of discs of different diameters pivoted together at their centers, a plurality of variously colored segmental areas carried by one of said discs to be matched against material to be color adjusted, and a plurality of segmental areas carried by the other disc to display colors to which the material may be adjusted, a plurality of sets of coloring directions carried by one of said discs associated with the said areas, one set in association with each area appropriate to each of the areas upon the remaining disc, and an indicator associated with each of the areas upon said remaining disc to designate the appropriate set of directions to bring the existing color of material shown by one of a pair of juxtaposed areas to the desired color of the other area.

4. A coloring meter comprising, in combination, a pair of discs of different diameters pivoted together at their centers, each disc radially divided adjacent its edge into a plurality of variously colored areas, the areas on one disc corresponding to various colors to be matched with the existing color of material to be color adjusted and the areas on the remaining disc corresponding to colors which may be desired in the material, a plurality of sets of directions in radial alignment with each area upon the larger disc and at different distances from its center and an opening in the smaller disc in radial alignment with each area thereon, said openings being arranged at progressively increasing distances from the center to display therethrough the appropriate set of directions to bring existing material color shown on one disc area to the desired color shown on the other disc area when any two areas are radially aligned.

5. A coloring meter comprising, in combination, a pair of discs pivoted together at their centers, one disc having a plurality of segments each of a different color and corresponding to a known material, the other disc having segments each of a different color and each corresponding to a color desired for the material, the segments of one disc each having a slot therethrough, said slots being at progressively increasing distances outwardly from the said centers, indicating means on each segment registrable with each slot to aid in determining the quantity of matter to be admixed with material according to the coloring of one disk to produce material of the coloring of the other disc, the said arrangement of the slots insuring the slotted disc covering the indicating means located out of registry therewith when either of the segments of one disc registers with either segment of the other disc.

RAYMOND L. SPERBER.